United States Patent [19]
Iwai et al.

[11] Patent Number: 5,789,880
[45] Date of Patent: Aug. 4, 1998

[54] VIBRATION TYPE MOTOR APPARATUS

[75] Inventors: Isao Iwai, Utsunomiya; Reiji Mitarai, Hachioji, both of Japan

[73] Assignee: Canon Kabushiki Kaisha, Tokyo, Japan

[21] Appl. No.: 584,142

[22] Filed: Jan. 11, 1996

[30] Foreign Application Priority Data

Jan. 12, 1995 [JP] Japan .................................. 7-003410

[51] Int. Cl.[6] .................................................. H02N 2/00
[52] U.S. Cl. ........................... 318/116; 310/316; 310/317
[58] Field of Search ............................ 318/116; 310/316, 310/317, 323

[56] References Cited

U.S. PATENT DOCUMENTS 5,459,369  10/1995  Mitarai et al. ..................... 310/317

FOREIGN PATENT DOCUMENTS 6-351270  12/1994  Japan .

*Primary Examiner*—Steven L. Stephan
*Assistant Examiner*—Judson H. Jones
*Attorney, Agent, or Firm*—Fitzpatrick, Cella, Harper & Scinto

[57] ABSTRACT

A vibration type motor apparatus including a control system for applying a cyclic signal to an electro-mechanical energy conversion element to drive a vibration member, and obtaining a driving force therefrom. The system solves the problem of a dead band in the motor apparatus and provides a motor having good response characteristics and good controllability.

4 Claims, 6 Drawing Sheets

VIBRATION TYPE MOTOR APPARATUS

BACKGROUND OF THE INVENTION

1. Field of the Invention

The present invention relates to a vibration type (vibration wave) motor control apparatus.

2. Related Background Art

As is well known in the art, a vibration type motor is a driving source for generating a driving force by using the friction between a vibration member and a movable member, and hence is a control object having a dead band. This motor is also a control object whose characteristics change with ambient temperature or time. A vibration type motor therefore demands more complicated control than an electromagnetic motor.

As a prior art system for controlling a vibration type motor, FIG. 5 shows the arrangement of a control system disclosed in "Ultrasonic Motor Speed Control Based on Adaptive Control", the *Proceedings of Standard of the Japanese Electrotechnical Committee* D113-10 (1993).

Referring to FIG. 5, a vibration type (vibration wave) motor is a control object 1. An input for driving the motor is displayed as an operation amount 4, and an output from the motor is displayed as a control amount 5. A target value generator 17 generates a target value 16. An adjustable compensator 11 includes a front end compensator 13 for generating the operation amount 4, and a feedback compensator 12 which receives the control amount 5 and serves as a constituent element of a feedback loop. An output, i.e., a feedback amount 14, of the adjustable dead band compensator 11 is added to the target value 16 to produce an error amount 15. The error amount 15 is input to the front end compensator 13.

The operation amount 4 as the output from the front end compensator 13 and the control amount 5 as the output from the vibration type motor (control object 1) are input to an identification mechanism 32. The identification mechanism 32 then generates an estimated parameter 21 on the basis of the two inputs. A desired pole setting device 24 sets a desired pole 25 exhibiting desired characteristics, and supplies the desired pole 25 to a compensator adjustment mechanism 23. The compensator adjustment mechanism 23 performs an arithmetic operation and adjusts the front end compensator 13 and the feedback compensator 12 such that the characteristics set by the desired pole setting device 24 are obtained even if the vibration type motor undergoes characteristic variations or a disturbance 33 occurs.

The above known control apparatus has the identification mechanism. With this arrangement, even if the motor undergoes characteristic variations or load variations, the apparatus can follow such variations.

FIGS. 6A and 6B show waveforms in a case wherein the prior art control system is used for a system having a dead band. FIG. 6A shows the waveform of an estimated parameter. FIG. 6B shows the waveform of a control amount. As shown in FIGS. 6A and 6B, the control amount is disturbed by the dead band. The estimated parameter also varies. When large estimated parameter variations occur, even the stability of the control system will be lost.

SUMMARY OF THE INVENTION

According to one aspect of the application, there is provided a vibration type motor control apparatus which can solve the above problems in the conventional apparatus, and can accurately control a vibration wave motor as a control object by properly adjusting a compensator without being influenced by a dead band (if present) even if the characteristics of the motor vary.

According to one aspect of the application, a fixed dead band compensator having a bias value sufficiently larger than the dead band width is arranged before the dead band, and data including an output from the fixed dead band compensator is input to an identification mechanism. With this arrangement, a parameter is estimated while substantially no dead band is present. In addition, a variable compensator for compensating for an excessive offset caused by the fixed dead band compensator is arranged before the variable compensator, thereby constituting an adaptive control system. With this arrangement, even in a motion control system for a vibration type motor with a dead band, a vibration type motor control apparatus is realized, which is free from a deterioration in control performance even if a deterioration in quality is caused by friction over time or characteristic variations occur.

The above and other objects, features, and advantages of the present invention will be apparent from the following detailed description in conjunction with the accompanying drawings and the appended claims.

DETAILED DESCRIPTION OF THE PREFERRED EMBODIMENT

An embodiment of the present invention will be described below.

Figure 1:
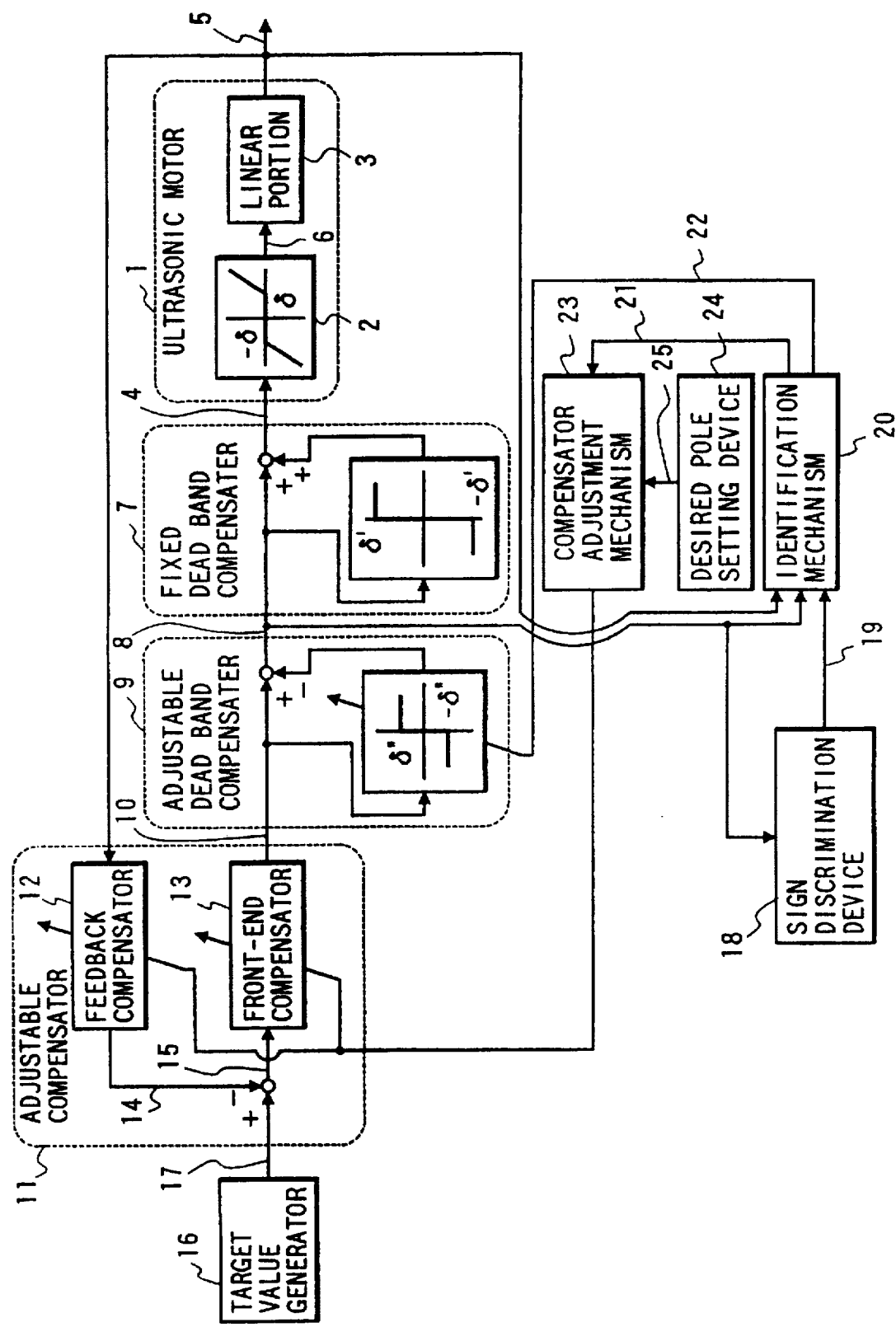
FIG. 1 is a block diagram showing the arrangement of a vibration type motor control apparatus to which the present invention is applied.

FIG. 1 shows a vibration type motor control apparatus according to an embodiment of the present invention.

The input/output characteristics of a vibration type (vibration wave) motor 1 as a control object are constituted by a dead band 2 and a linear portion 3. An input to the motor 1 is an operation amount 4 (representing the amplitude of a cyclic signal having a predetermined frequency), and an output from the motor 1 is a control amount 5. The motor 1 has first and second piezoelectric member groups disposed on different areas of a vibration member. Cyclic signals having amplitudes corresponding to the operation amount 4 and different phases are respectively applied to the first and second piezoelectric member groups to generate traveling waves.

The dead band 2 and the operation amount 4 (amplitude) have the following relationship:

$$u'(k) = \begin{cases} u(k) + \delta & \text{for } u(k) > \delta \\ 0 & \text{for } -\delta \leq u(k) \leq \delta \\ u(k) - \delta & \text{for } -\delta > u(k) \end{cases} \quad (1)$$

where u(k) is the operation amount, u'(k) is a dead band output 6 which cannot be observed in general, and δ is the dead band width.

A fixed dead band compensator 7 has a bias value δ' sufficiently larger than the dead band width δ. An input to the compensator 7 is a virtual operation amount 8, and an output therefrom is the operation amount 4. This device serves to guarantee the operation of the control object from the viewpoint of the virtual operation amount 8.

In this case, a new system constituted by the control object 1 and the fixed dead band compensator 7 is regarded as a magnification system control object.

Figure 2A:
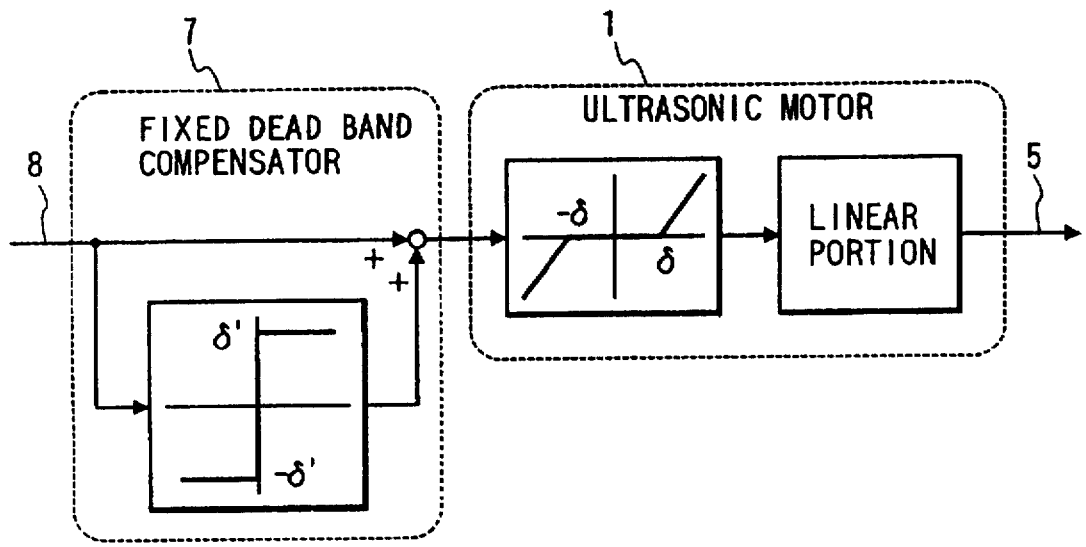
FIG. 2A is a block diagram showing the arrangement of the control elements of a vibration type motor 1 as a control object and the constituent elements of a fixed dead band compensator 7.
Figure 2B:
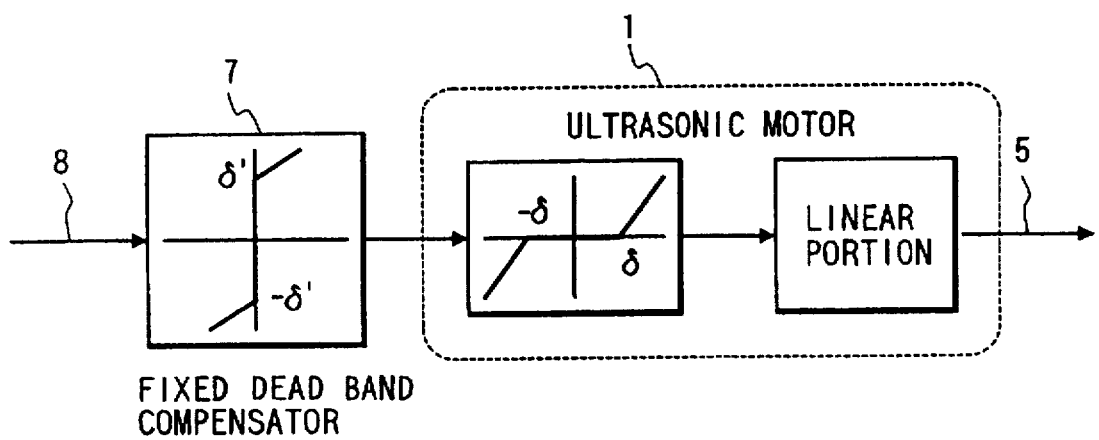
FIG. 2B is a block diagram showing a modification of the fixed dead band compensator 7.
Figure 2C:
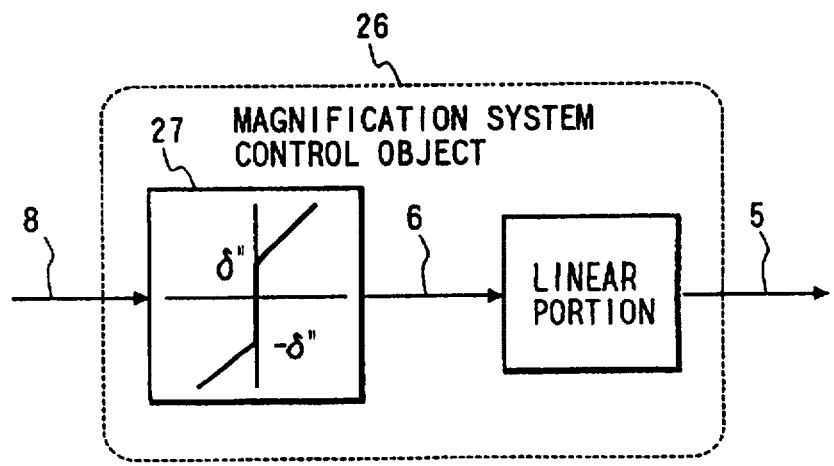
FIG. 2C is a block diagram showing a magnification system control object 26 including an offset 27 as an apparent modification of the fixed dead band compensator 7.

A magnification system control object 26 can be expressed as shown in FIG. 2C.

FIG. 2A shows only the control object 1 and the fixed dead band compensator 7.

FIG. 2B shows a modification of the fixed dead band compensator 7. Since the bias value δ' of the fixed dead band compensator 7 is sufficiently larger than the dead band width δ, an apparent magnification system control object can be expressed as shown in FIG. 2C even if the dead band width δ varies. Although the magnification system control object 26 is influenced by an offset 27 of a magnification control system depending on an input sign, the influence of the dead band 2 can be apparently eliminated.

An input to an adjustable dead band compensator 9 is a linear operation amount 10, and an output therefrom is the virtual operation amount 8. A variable bias value δ" is adjusted by an offset estimated value 22.

An adjustable compensator 11 for compensating for a linear portion includes a front end compensator 13 and a feedback compensator 12. An input to the feedback compensator 12 is the control amount 5, and an output therefrom is a feedback amount 14. An input to the front end compensator 13 is an error amount 15 between a target value 17 and the feedback amount 14, and an output therefrom is the linear operation amount 10.

An identification mechanism 20 receives the virtual operation amount 8, the control amount 5, and a sign discrimination signal 19, and calculates the estimated values of a parameter and an offset of the magnification system control object. A compensator adjustment mechanism 23 then performs calculation using an obtained estimated parameter 21 to obtain the characteristics set by a desired pole setting device 24, thereby adjusting the feedback compensator 12 and the front end compensator 13.

A sign discrimination device 18 outputs a sign discrimination signal 19 of "+1" or "−1" in accordance with the sign of the virtual operation amount 8.

The arrangement of this embodiment has been described above, together with the function of the present invention. Each of the above mechanisms will be described in detail below.

The identification mechanism 20 will be described first.

In order to eliminate the influence of the dead band 2, the identification mechanism 20 identifies a new magnification system control object 26 to which the virtual operation amount 8 is input and from which the control amount 5 is output.

Figure 3:
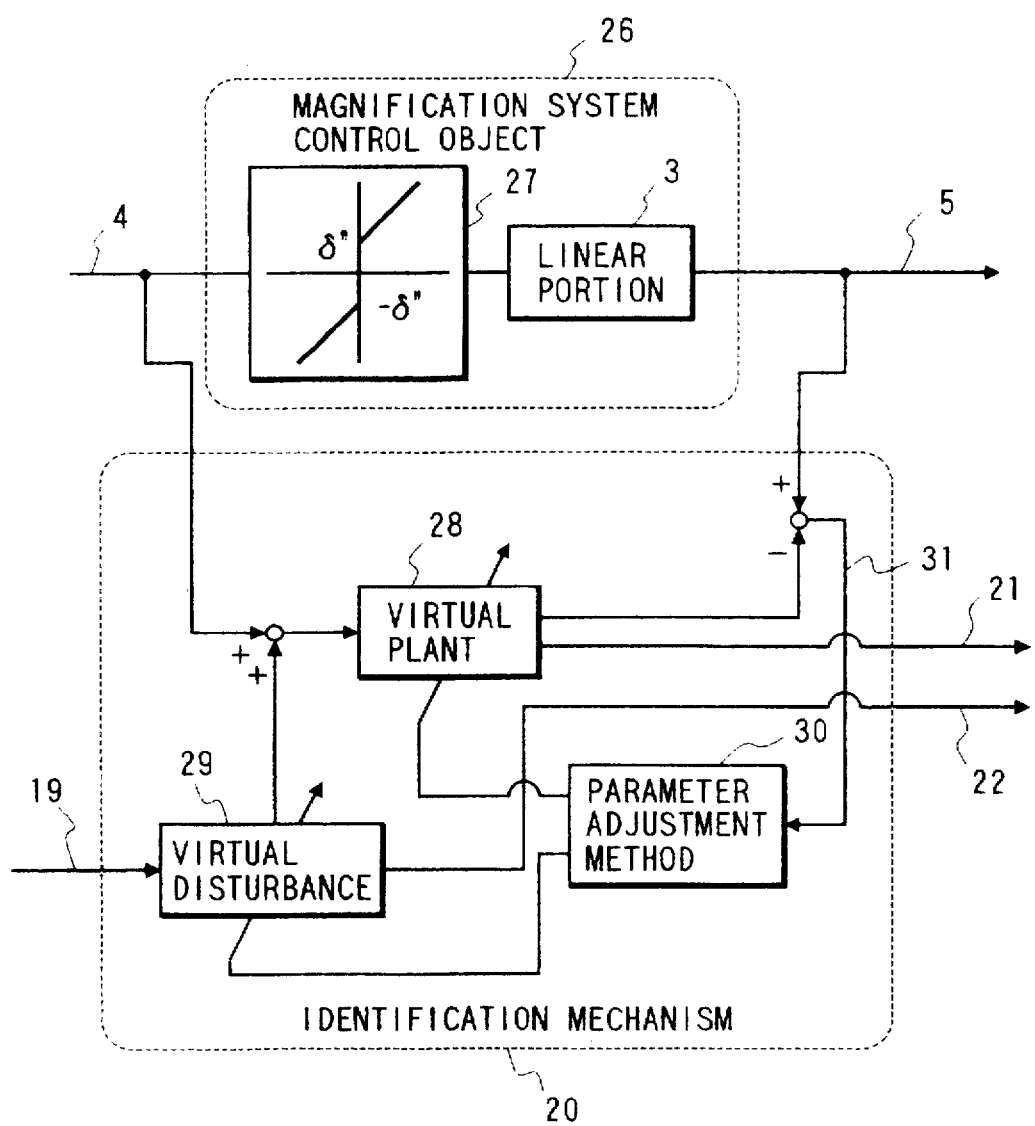
FIG. 3 is a block diagram showing the arrangement of an adaptive control system for the magnification system control object 26.

FIG. 3 is a block diagram of the identification mechanism 20.

The magnification system control object 26 can be expressed as follows:

$$y(k) = z^{-dl} \frac{B(z^{-1})}{A(z^{-1})} u''(k) + \delta^0 q(k) = P^T \psi(k) \quad (2)$$

$$A(z^{-1}) = 1 + \sum_{i=1}^{n} a_i z^{-i} \quad (3)$$

$$B(z^{-1}) = \sum_{i=0}^{m} b_i z^{-i} \quad (4)$$

$$P = [a_1 \ldots a_n \, b_0 \ldots b_m \, \delta^0]^T$$

$$\psi(k) = [-y(k-1) \ldots -y(k-n) \, u''(k-dl) \ldots u''(k-dl-m) q(k)]^T$$

$$dl \geq 0, \, q(k) \begin{cases} 1 & \text{for } u(k) > 0 \\ -1 & \text{for } u(k) < 0 \end{cases}$$

$$\delta^0 = \delta' - \delta$$

where u"(k) is the virtual operation amount 8, y(k) is the control amount 5, $z^{-1}$ is the delay operator, k is the discrete time, and T is transpose.

An identification mode constituted by a virtual plant 28 and a virtual disturbance 29 is expressed by the following equations.

Note that a value with "^" is an estimated value.

$$y(k) = z^{-dl} \frac{\hat{B}(z^{-1})}{\hat{A}(z^{-1})} u''(k) + \hat{\delta}^0 q(k) \quad (5)$$

$$= \hat{P}(k)^T \psi(k)$$

$$\hat{A}(z^{-1}) = 1 + \sum_{i=1}^{n} \hat{a}_i(k) z^{-i} \quad (6)$$

$$\hat{B}(z^{-1}) = \sum_{i=0}^{m} \hat{b}_i(k) z^{-i} \quad (7)$$

$$\hat{P}(k) = [\hat{a}_1(k) \ldots \hat{a}_n(k) \, \hat{b}_0(k) \ldots \hat{b}_m(k) \, \hat{\delta}^0(k)]^T$$

where $\hat{P}(k)$ is the estimated parameter 21 and the offset estimated value 22, which can be obtained in the following forms by a parameter adjustment method 30:

$$\hat{P}(k) = \hat{P}(k-1) + \kappa(k) F(k-1) \psi(k) \epsilon^*(k) \quad (8)$$

$$F(k) = F^*(k)/\lambda(k) \quad (9)$$

$$\kappa(k) = \frac{1}{1 + \psi^T(k) F(k) \psi(k)} \quad (10)$$

$$F^*(k) = [I - \kappa(k) F(k-1) \psi^T(k)] F(k-1) \quad (11)$$

$$\epsilon^*(k) = y(k) - \hat{P}^T(k-1) \psi(k) \quad (12)$$

$$\epsilon(k) = y(k) - \hat{P}^T(k) \psi(k) \quad (13)$$

where F(k) is the adaptive gain associated with the identification speed, ε(k) is an identification error 31, and λ(k) is the forgetting factor.

The adjustable dead band compensator 9 will be described next.

The adjustable dead band compensator 9 serves to cancel the offset of the magnification system control object 26. Since the offset estimated value 22 estimated by the identification mechanism 20 is the difference between the dead band width 6 and the bias value δ' of the fixed dead band compensator 7, the adjustable dead band compensator 9 adjusts the variable bias value δ" as follows:

$$\delta" = \hat{\delta}^o(k)$$

With this operation, the offset of the magnification system control object 26, i.e., the influences of the dead band 2 and the fixed dead band compensator 7, can be removed.

More specifically, the identification mechanism 20 receives the control amount 5 and the virtual operation amount 8, and obtains the offset estimated value 22. The identification mechanism 20 then sets the variable bias value δ" corresponding to the difference between the dead band width δ and the bias value δ' in the adjustable dead band compensator 9, and performs identification such that the dead band becomes substantially zero.

By using the feedback compensator 12 and the front end compensator 13, a closed loop pole can be arbitrarily set, i.e., control performance can be set in accordance with specifications. This operation will be described finally.

The compensator adjustment mechanism 23 adjusts the feedback compensator 12 and the front end compensator 13 to satisfy the following equations (14) and (15) using the estimated parameter $$\hat{P}(k)$$

estimated by the identification mechanism 20, thereby setting the pole of the transfer function to be equal to the desired pole 25.

$$S(z^{-1})u^o(k) = r_e(k) - R(z^{-1})y(k) \quad (14)$$

$$D(z^{-1}) = \hat{A}(z^{-1}) + z^{-d1}\hat{B}(z^{-1})R(z^{-1}) \quad (15)$$

where $r_e$ is the target value 17, $u^o(k)$ is the linear operation amount 10, $S(z^{-1})$ is the parameter for the front end compensator 13, $R(z^{-1})$ is the parameter for the feedback compensator 12, and $D(z^{-1})$ is the desired pole 25, which is arbitrarily provided by the desired pole setting device 24.

Figure 4A:
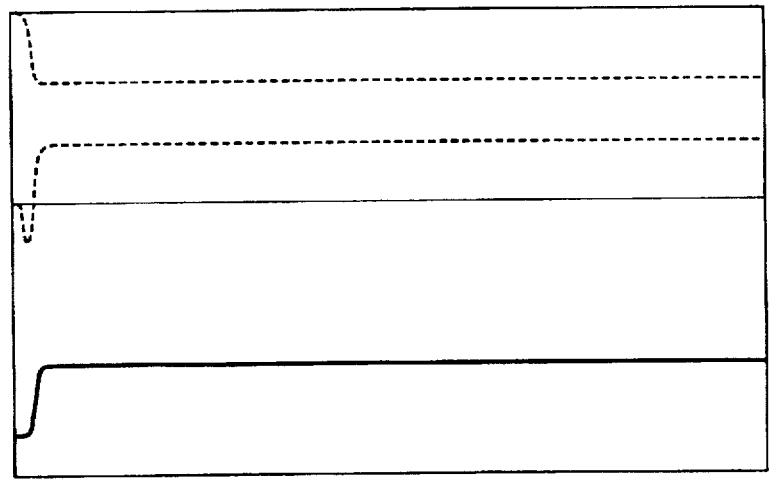
FIG. 4A is a chart showing the waveform of an estimated parameter produced by an identification mechanism 20 in the control apparatus of the present invention.
Figure 4B:
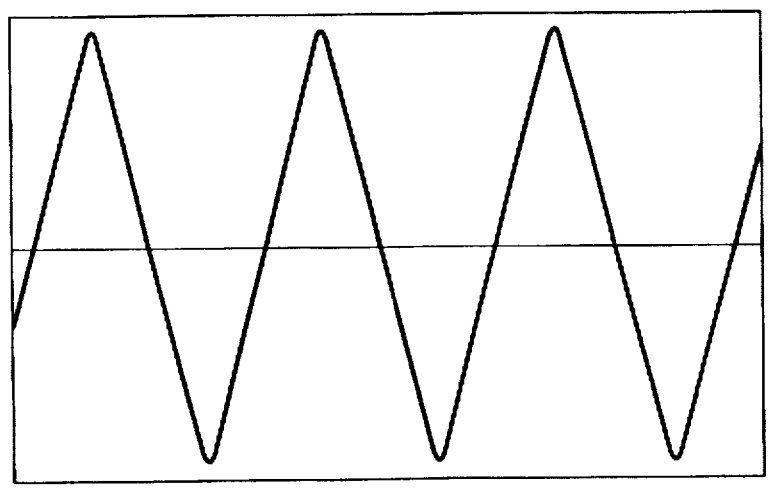
FIG. 4B is a chart showing the waveform of a control amount in the control apparatus of the present invention.
Figure 5:
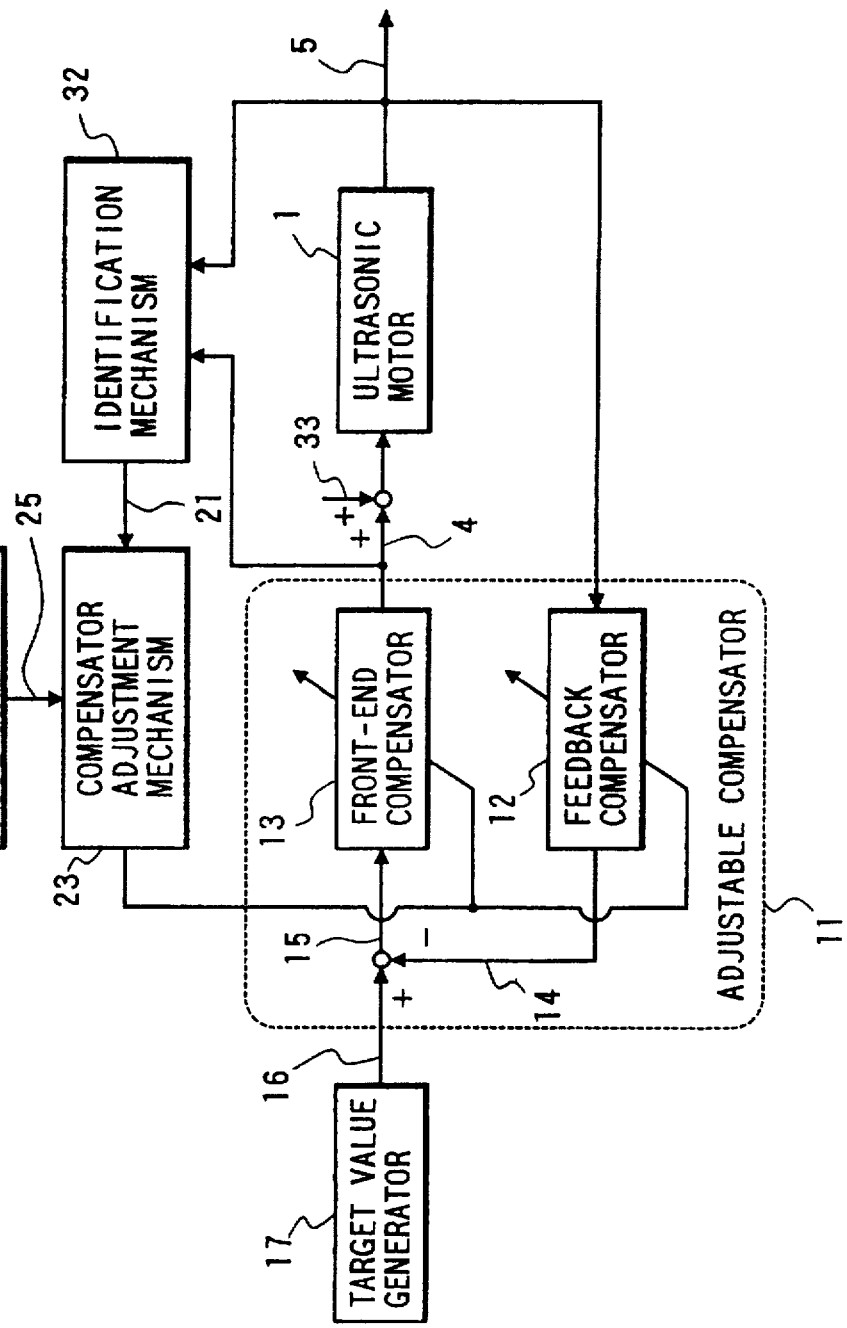
FIG. 5 is a block diagram showing the arrangement of a conventional vibration type motor control apparatus.
Figure 6A:
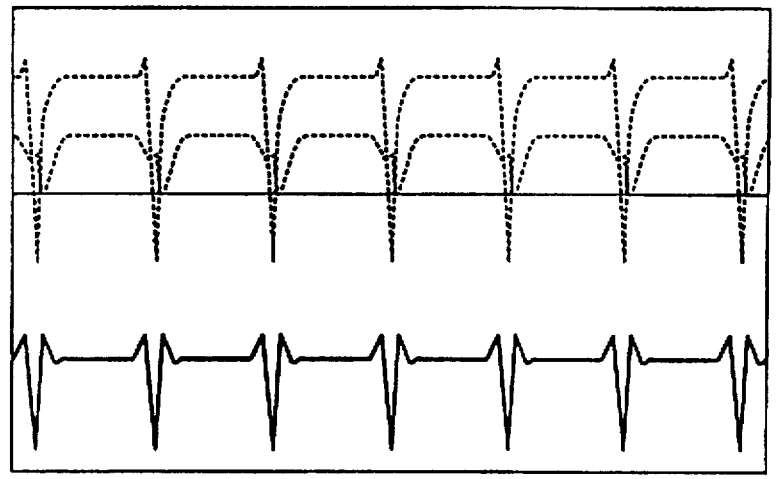
FIG. 6A is a chart showing the waveform of an estimated parameter 21 generated by an identification mechanism 32 in the arrangement in FIG. 5.
Figure 6B:
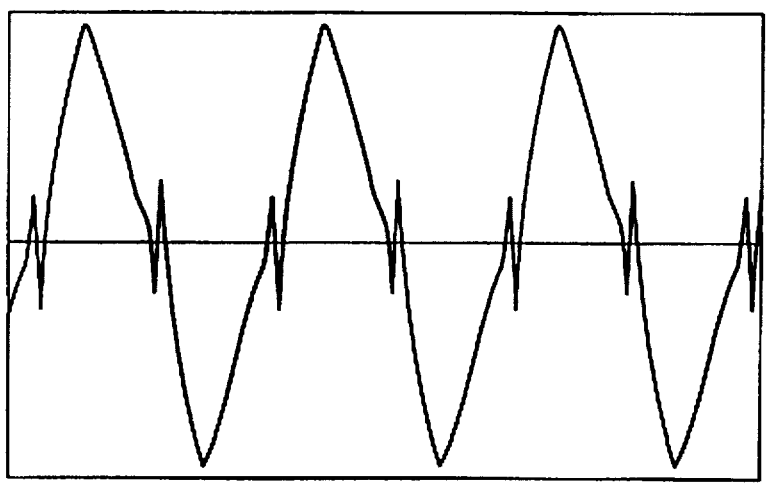
FIG. 6B is a chart showing the waveform of a control amount 5 in the arrangement in FIG. 5.

FIGS. 4A and 4B show waveforms in this embodiment. FIG. 4A shows an estimated parameter. FIG. 4B shows a control amount.

As shown in FIGS. 4A and 4B, satisfactory control performance is realized even in a control object having a dead band without estimated parameter variations.

As has been described above, according to the present invention, even if a dead band is present and varies in a motion control system using a vibration type motor, proper identification can be performed as in the case wherein no dead band is present, and good control performance can be maintained even in the presence of characteristic or load variations.

In addition, since the identification mechanism operates properly without being influenced by a dead band, parameter adjustment need not be performed The cost associated with adjustment can therefore be reduced. Furthermore, there is provided a high-performance control apparatus which can prolong the service life of a product by automatically adjusting the compensator even if a deterioration in quality is caused by friction over time.

What is claimed is:

1. A vibration type motor apparatus having a dead band within which no output is generated with respect to an input signal, comprising:

(a) a fixed dead band value setting circuit for setting a fixed bias value larger than a width of the dead band;

(b) a variable dead band value setting circuit for setting a variable bias value;

(c) an adjustment circuit for adjusting the bias value of said variable dead band value setting circuit in accordance with an output from said motor; and (d) a driving circuit for applying an input signal to said vibration type motor through said fix dead band value setting circuit and said variable dead band value setting circuit.

2. An apparatus according to claim 1, wherein said variable dead band value setting circuit is arranged before said fixed dead band value setting circuit, and said adjustment circuit adjusts the bias value on the basis of an output from said variable dead band value setting circuit and a motor output.

3. An apparatus according to claim 2, wherein the input signal is input to said variable dead band value setting circuit.

4. A vibration type motor apparatus having a dead band within which no output is generated with respect to an input signal, comprising:

(a) a fixed dead band value setting circuit for setting a fixed bias value larger than the dead band width;

(b) a variable dead band value setting circuit arranged before said fixed dead band value setting circuit and adapted to set a variable bias value;

(c) a sign discrimination device for discriminating a sign of an output from said variable dead band value setting circuit; and (d) an identification mechanism for receiving outputs from said variable dead band value setting circuit, said sign discrimination device, and a motor and estimating an offset value of said motor, said variable dead band value setting circuit providing an adjustment to said bias value set therein in accordance with the estimated offset value.

* * * * *